United States Patent [19]
Cordola et al.

[11] Patent Number: 5,607,126
[45] Date of Patent: Mar. 4, 1997

[54] SUPPORT AND PROTECTION HOUSING ELEMENT FOR A TUBE, PIPE, ELECTRIC CABLE OR OTHER LONG ARTICLE, PARTICULARLY FOR A MOTOR VEHICLE

[75] Inventors: Jean-Pierre Cordola, Garches; Rachid Idjakiren, Beauchamp, both of France

[73] Assignee: ITW De France, Beauchamp, France

[21] Appl. No.: 509,635

[22] Filed: Jul. 31, 1995

[30] Foreign Application Priority Data

Sep. 12, 1994 [FR] France .................... 94 10865

[51] Int. Cl.$^6$ .................................... F16L 3/22
[52] U.S. Cl. .................. 248/68.1; 248/74.2; 248/316.7
[58] Field of Search ................... 248/68.1, 74.2, 248/316.7, 49

[56] References Cited

U.S. PATENT DOCUMENTS

| | | |
|---|---|---|
| 4,840,333 | 6/1989 | Nakayama . |
| 5,467,948 | 11/1995 | Gillespie ................ 248/68.1 |
| 5,535,969 | 7/1996 | Duffy, Jr. .............. 248/68.1 |

FOREIGN PATENT DOCUMENTS

| | | |
|---|---|---|
| 0599662 | 1/1994 | European Pat. Off. . |
| 3405094 | 8/1985 | Germany . |

Primary Examiner—Ramon O. Ramirez
Assistant Examiner—Michael J. Turgeon
Attorney, Agent, or Firm—Schwartz & Weinrieb

[57] ABSTRACT

A support for mounting elongate articles, such as, tubes, pipes, conduits, cables, or the like, comprises a base member having a longitudinal extent, and a plurality of support members disposed transversely across the base member for engaging and supporting the elongate articles. The support members are longitudinally spaced upon the base member and engage opposite sides or regions of the elongate articles, such as, for example, upper regions or surface portions, and lower regions or surface portions. The upper support members comprise a plurality of deformable, resilient, and flexible blade members, and the lower support members comprise either cut-out portions formed within partition members, or similar resiliently flexible and deformable blade members.

31 Claims, 1 Drawing Sheet

SUPPORT AND PROTECTION HOUSING ELEMENT FOR A TUBE, PIPE, ELECTRIC CABLE OR OTHER LONG ARTICLE, PARTICULARLY FOR A MOTOR VEHICLE

FIELD OF THE INVENTION

The present invention in general terms relates to a support for the holding of long articles and relates particularly to a support for holding long articles forming part of motor vehicle equipment.

BACKGROUND OF THE INVENTION

The aforenoted type of support can apply, for example, to tubes or pipes necessary for the circulation of any type of hydraulic fluid, such as fuel or brake fluid.

However, it can also concern electric cables or, more precisely, bundles of such cables.

In practice, these various long articles are located underneath the motor vehicle which they equip, being suspended from the floor of the latter by shackles or other support members acting locally from place to place.

To protect the articles from any water splashing, objects which may cause chipping thereof, salt or other debris, it is now being proposed to additionally affix after the articles have been installed underneath the vehicle floor, a housing which, elongate in a channel form, is usually made of a synthetic material.

It is now also envisaged to give an additional role to such a housing, giving it the function of supporting such long articles, to allow the production of a complete unified subassembly to be fixed as such under the floor of the motor vehicle when the latter is being assembled.

To this end, this housing must obviously have, projecting from its base, fixing means suitable for supporting at least one of the long articles in question.

At the same time it is important that the housing should be suitable for a range of different diameters of these long articles and, moreover, some diversity in location of the latter.

OBJECT OF THE INVENTION

The object of the present invention is a support and protection housing element which advantageously meets the aforenoted requirements in a particularly simple manner, while being easy and economical to produce and which also has other advantages.

SUMMARY OF THE INVENTION

This support and protection housing element is of the type having, projecting from a base portion thereof, fixing means suitable for supporting at least one long article, and it is generally characterised in that these fixing means are formed by the cooperation of two separate elements staggered longitudinally with respect to one another along the base, namely a holding element able to act, from one side of the base, on the article to be held and protected, and a support element able to act on the article from the opposite side.

Through the separation thus made of the fixing means into two elements, each one intended to act respectively on two opposite sides of the article or articles to be held and protected, and by the longitudinal staggering of these two elements, it is advantageously possible to obtain parting plane moulding of the entire support and protection housing element according to the invention, without using any slides or other movable parts on the necessary tools.

The design of these tools is thereby advantageously simplified, to the benefit of their cost and maintenance.

Additionally, the support and protection housing element according to the invention advantageously has at its ends complementary engagement means suitable for its joining to another support and protection housing element of the same type, for the purpose of forming a support and protection housing of greater length.

Briefly, the arrangement according to the invention advantageously allows parting plane moulding of a support and protection housing element, and the production, by means of several such elements, of very long support and protection housings, and it also affords, advantageously, an overall reduction in production costs.

BRIEF DESCRIPTION OF THE DRAWINGS

Other characteristics and advantages of the invention will also emerge from the following description given by way of example and with reference to the accompanying diagrammatic drawings, in which like reference characters designate like or corresponding parts throughout the several views, and wherein.

DETAILED DESCRIPTION OF THE PREFERRED EMBODIMENT

Figure 1:
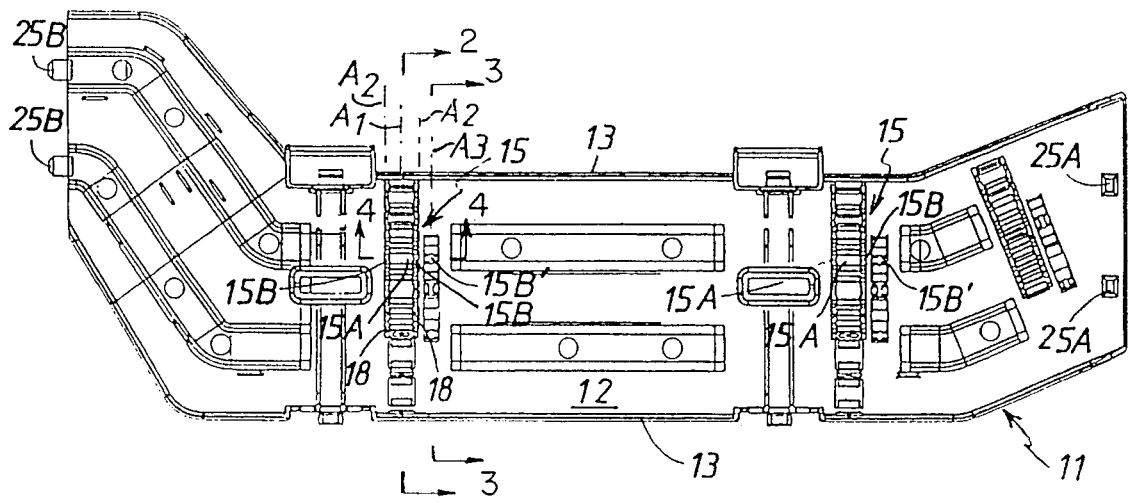
FIG. 1 is a plan view from above of a support and protection housing element according to the invention.
Figure 2:
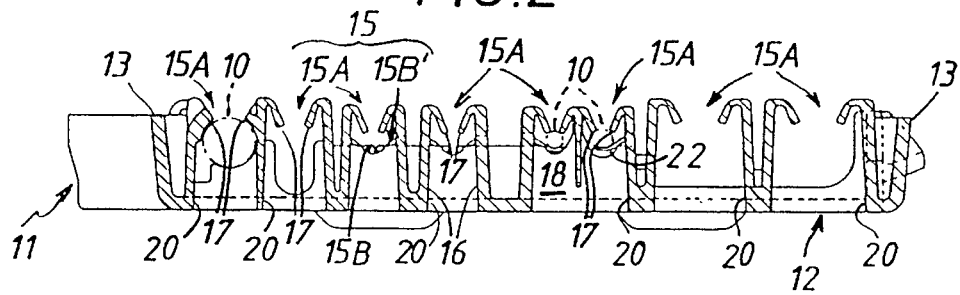
FIGS. 2 and 3 are views in transverse section, on a larger scale, of the support and protection housing element of FIG. 1, each respectively along the lines 2—2 and 3—3 in FIG. 1.
Figure 3:
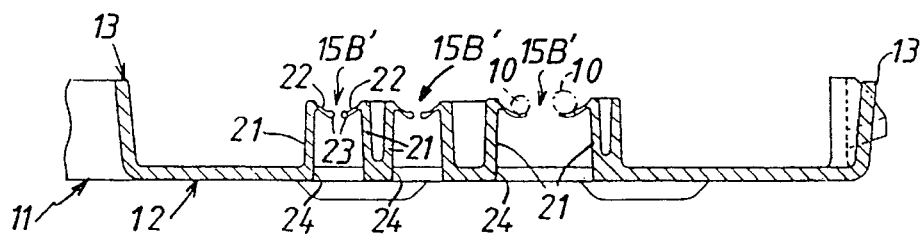
Figure 4:
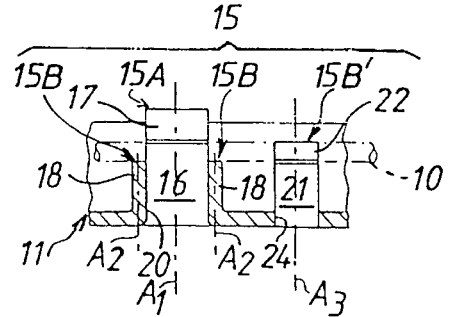
FIG. 4 is, on the scale of FIGS. 2 and 3, a view thereof in partial longitudinal section along the line 4—4 in FIG. 1.

As illustrated in broken lines in FIGS. 2, 3 and 4, it is an overall object of the present invention to provide a means for the support and protection of long articles 10 which can be, for example, tubes, pipes or electric cables, in isolation or in bundles, and which, for example, form part of the equipment of a motor vehicle.

To provide this support and protection, at least one housing element 11 is used, suitable for being fixed under the floor of the motor vehicle.

Such a housing element 11, whose outline in plan view is rectilinear or more or less sinuous, will not be described in every detail here.

Only the elements necessary for an understanding of the invention will be described.

Overall, this housing element 11 is in the general form of a channel, with a flat base 12 and, along the longitudinal edges of the latter, two flanges 13.

It includes projecting from the base 12, fixing means 15 suitable for supporting at least one article 10.

According to the invention, these fixing means 15 are formed by the cooperation of two separate elements 15A, 15B and/or 15B' staggered longitudinally with respect to each other along the base 12, parallel to the flanges 13, namely a holding element 15A able to act on the article 10 to be held and protected, along one side thereof; and a support element 15B and/or 15B' able to act on this article 10 from the opposite side thereof.

In the embodiment depicted, the holding element 15A has two legs 16 which, aligned transversely with respect to the base 12, project with respect to this base 12, and two elastically deformable blades 17 which, each originating respectively from the legs 16, extend from the faces of the latter and are oriented towards each other and which, in practice, have the same width as them.

The two legs 16 of the holding element 15A extend longitudinally from one of two partitions 18 to the other, the partitions extending transversely with respect to the base 12 and, in practice, they are flat walls of a greater height than the flanges 13.

The two partitions 18, which are parallel to one another, are made in one piece with the base 12 and extend over only a fraction of the height of the legs 16 from this base 12.

In practice there is, transversely with respect to the base 12, at least one line of fixing means 15, and therefore at least one line $A_1$ of holding elements 15A.

In the figures, this line $A_1$ is designated by broken lines, assuming it to be concentrated in the transverse plane of the assembly passing through the median area of the legs 16.

The partitions 18 run continuously from one to the other of the end holding elements 15A of such a line $A_1$.

With most of the holding elements 15A, the legs 16 are also made in one piece with the base 12, like the partitions 18.

However, with at least one of the holding elements 15A, at least one of the legs 16 is suspended above the base 12, made in one piece with each of the partitions 18.

In practice, in the embodiment depicted, the same is true for a single leg 16 that two adjacent holding elements 15A have in common.

With the majority of the holding elements 15A, the two elastically deformable blades 17 extend in an overhanging manner towards the base 12 from the legs from which they originate, and in doing so they get closer to each other in the direction of the base 12.

In practice, in such case, they are joined to the ridge line of the legs 16, and are joined to the latter in a more or less rounded manner.

However, for one of the holding elements 15A, which runs immediately alongside one of the flanges 13 and which is intended to hold an article 10 of a relatively large diameter, the elastically deformable blades 17 get closer to each other in the direction opposite to or away from the base 12.

They are also shorter and more rigid.

In every case, the free end of each elastically deformable blade 17 remains at a distance from the edge of the partitions 18, above the edge.

Also in every case, the base 12 has, between the legs 16 of each holding element 15A, a recess 20 which, transversely, extends from one of these legs 16 to the other, which is, crosses such a leg 16 when it is the case of the leg suspended from the partitions 18, and which, transversely, extends from one of these partitions 18 to the other and, therefore, over the entire width at least of the elastically deformable blades 17.

The support element 15B associated with a holding element 15A belongs to one or the other or both of the two partitions 18 being, for example, formed by a cut-out which affects the edge of the latter and which is more or less pronounced.

With two of the holding elements 15A, which are close to one of the flanges 13 and which have a width greater than the others, no cut-out, however, is provided on the edge of the partitions 18.

With the others, the partitions 18 each constitute a line $A_2$ of support elements 15B, transversely with respect to the base 12.

In the figures, this line $A_2$ has been designated in broken lines, assuming it to be concentrated in the transverse plane of the assembly passing through the median area of the partitions 18.

The distance separating it from the line $A_1$ defines the corresponding longitudinal staggering.

The support element 15B', which may, at the same time, be associated with a holding element 15A, is separate from a partition 18 with respect to the holding element 15A and has, in the embodiment depicted, two legs 21 which, aligned transversely with respect to the base 12, project with respect to the base, and two elastically deformable blades 22 which, each originating respectively from these legs 21, extend over the faces of the latter and are oriented towards each other, and which, in practice, have the same width as them.

Like the legs 16 of a holding element 15A, the legs 21 of a support element 15B' constitute flat walls, but they extend over a lesser height, which, in practice, is less than that of the flanges 13 while being slightly greater than that of the partitions 18 at this point.

Additionally, they are all made in one piece with the base 12.

The elastically deformable blades 22 of the support element 15B' extend in an overhanging manner towards the base 12 from the legs 21 from which they originate, and in doing so they get closer to each other in the direction of this base.

However, the angle of the dihedron which they form at rest is, in practice, significantly greater than that of the dihedron which the elastically deformable blades 17 of the holding element 15A form at rest.

In the embodiment depicted, the elastically deformable blades 17 of a support element 15B' each have an enlargement 23 along their free edge.

They are also each slightly curved, with their concave face turned towards a direction opposite to the base 12.

In practice, a support element 15B' is provided for only some of the holding elements 15A.

These are the holding elements 15A situated in the median area of the base 12.

For each of these holding elements 15A, there is then, concurrently, a support element 15B belonging to one or the other or both of the two partitions 18, and a support element 15B' with legs 21 and elastically deformable blades 22.

Like the holding elements 15A, the support elements 15B' form a line $A_3$, transversely with respect to the base 12.

In the figures, this line $A_3$ is designated by broken lines, assuming it to be concentrated in the transverse plane of the assembly passing through the median area of the legs 21.

The distance which separates it from the line $A_1$, which is significantly greater than that which separates the line $A_2$ of support elements 15B from the line $A_1$, defines the corresponding longitudinal staggering.

For all the support elements 15B', the base 12 has, between the legs 21, a recess 24 which, transversely, extends from one of these legs 21 to the other, at least, and which, longitudinally, extends over the entire width of the latter and therefore over the entire width at least of the elastically deformable blades 22.

As can easily be understood, by reason of the recesses 20 and 24 in the base 12, the housing element 11 according to the invention can advantageously be moulded with a parting plane, in spite of the presence of the corresponding elastically deformable blades 17 and 22.

In the embodiment depicted, the housing element 11 according to the invention has, transversely with respect to the base 12, at least two lines of fixing means 15 disposed at a distance from one another along the base 12.

When an article 10 is engaged in such fixing means 15, it elastically deforms the elastically deformable blades 17 from their normal positions upon the holding element 15A comprising the fixing means, until it is engaged under these elastically deformable blades 17 and thus held by them.

As can also easily be understood, the elastically deformable blades 22 of the support element 15B' optionally associated with holding element 15A advantageously push, in the direction of the elastically deformable blades 17, the article 10 previously engaged under the latter, thus enabling a range of different diameters for such an article 10 to be catered for, notably when the latter does not come to bear, at the same time, on a support element 15B.

Moreover, in the embodiment depicted, the housing element 11 according to the invention also has at its ends complementary engagement means 25A, 25B, suitable for its joining to another housing element 11 of the same type for the purpose of forming a housing of greater length.

For example, the engagement means 25A are simple openings and the engagement means 25B are lugs which, hook-shaped, are suitable for being engaged in such openings so as to be crimped, for example by heating, beyond the latter.

As a variant, there can be other types of engagement means such as, for example, engagement means suitable for being secured by threading or engagement means suitable for being secured by snap fitting in.

The present invention is moreover not limited to the embodiment described and depicted, but includes any variant embodiment. It is therefore to be understood that within the scope of the appended claims, the present invention may be practiced otherwise than as specifically described herein.

We claim:

1. A support for an elongate article, selected from the group comprising a tube, a pipe, an electrical cable, and a conduit, comprising: a base member having a substantially longitudinal extent; a first support means fixedly mounted upon said base member, disposed at a first longitudinal position along said longitudinal extent of said base member, and disposed at a first elevational level above said base member so as to engage a first side portion of an elongate article; and a second support means fixedly mounted upon said base member, disposed at a second longitudinal position along said longitudinal extent of said base member, and disposed at a second elevational level, different from said first elevational level, above said base member so as to engage a second opposite side portion of an elongate article; whereby an elongate article is able to be securely supported upon said base member as a result of the cooperation of said first and second support means engaging opposite side portions of an elongate article at said first and second longitudinally spaced positions.

2. A support as set forth in claim 1, wherein said first support means comprises:

a pair of legs laterally spaced with respect to each other so as to be disposed within a single transverse plane with respect to said longitudinal extent of said base member, and projecting upwardly away from said base member; and a pair of deformable blades flexibly and resiliently mounted upon free end portions of said pair of legs and oriented toward each other so as to cooperate with each other for engaging a first side portion of an elongate article.

3. A support as set forth in claim 2, wherein:

said pair of deformable blades are disposed in an overhanging manner with respect to said base member and are oriented with respect to each other such that free end portions of said blades become closer to each other in the direction approaching said base member.

4. A support as set forth in claim 2, wherein said second support means comprises:

a pair of legs laterally spaced with respect to each other so as to be disposed within a single transverse plane with respect to said longitudinal extent of said base member, and projecting upwardly away from said base member; and a pair of deformable blades flexibly and resiliently mounted upon free end portions of said pair of legs and oriented toward each other so as to cooperate with each other for engaging a second side portion of an elongate article.

5. A support as set forth in claim 1, wherein:

said second support means comprises partition means projecting upwardly away from said base member and having cut-out means defined therewithin for supportingly engaging a second opposite side portion of an elongate article.

6. A support as set forth in claim 5, wherein:

said partition means comprises a pair of partitions disposed upon opposite longitudinally disposed sides of said first support means.

7. A support as set forth in claim 5, wherein:

said first support means is integrally formed with said partition means.

8. A support as set forth in claim 5, wherein:

said second support cut-out means have acurate configurations with concave portions thereof located remote from said base member.

9. A support as set forth in claim 1, wherein:

said first support means comprises a plurality of first support elements laterally spaced with respect to each other in a first transverse plane across said base member; and said second support means comprises a plurality of second support elements laterally spaced with respect to each other in a second transverse plane across said base member.

10. A support as set forth in claim 1, wherein:

said second support means comprises a plurality of second support elements laterally spaced with respect to each other in a transverse plane across said base member.

11. A support as set forth in claim 10, wherein each one of said plurality of second support elements comprises:

a pair of legs laterally spaced with respect to each other so as to be disposed within a single transverse plane with respect to said longitudinal extent of said base member, and projecting upwardly away from said base member; and a pair of deformable blades flexibly and resiliently mounted upon free end portions of said pair of legs and oriented toward each other so as to cooperate with each other for engaging a second side portion of an elongate article.

12. A support as set forth in claim 11, wherein:

each one of said plurality of blade members of said second support elements comprises arcuate portions having concave configurations located remote from said base member.

13. A support as set forth in claim 1, wherein:

said first support means comprises a plurality of first support elements laterally spaced with respect to each other in a transverse plane across said base member.

14. A support as set forth in claim 13 wherein:

said second support means comprises partition means disposed transversely with respect to said base member and substantially parallel to said plurality of first support elements disposed within said transverse plane.

15. A support as set forth in claim 13, wherein each one of said plurality of first support elements comprises:

a pair of legs laterally spaced with respect to each other so as to be disposed within a single transverse plane with respect to said longitudinal extent of said base member, and projecting upwardly away from said base member; and a pair of deformable blades flexibly and resiliently mounted upon free end portions of said pair of legs and oriented toward each other so as to cooperate with each other for engaging a first side portion of an elongate article.

16. A support as set forth in claim 1, further comprising:

connecting means provided upon said base member for connecting said base member to a similar base member in order to provide a new base member having a longitudinal extent greater than that of said base member.

17. A support as set forth in claim 16, wherein:

said connecting means are provided upon opposite sides of said base member.

18. A support as set forth in claim 17, wherein:

said connecting means comprises openings formed within one end of said base member, and lug means formed upon the opposite end of said base member for insertion within openings formed within one end of said similar base member.

19. A support as set forth in claim 18, wherein:

said lug means are threaded; and said openings comprise threaded sockets for receiving said threaded lug means.

20. A support for an elongate article selected from the group comprising a tube, a pipe, an electrical cable, and a conduit, comprising: a base member having a substantially longitudinal extent; a first support means integral with said base member, disposed at a first longitudinal position along said longitudinal extent of said base member, and disposed at a first elevational level above said base member so as to engage a first side portion of an elongate article; a second support means integral with said base member, disposed at a second longitudinal position along said longitudinal extent of said base member, and disposed at a second elevational level, different from said first elevational level, above said base member so as to engage a second opposite side portion of an elongate article; whereby an elongate article is able to be securely supported upon said base member as a result of the cooperation of said first and second support means engaging opposite side portions of such an elongate article at said first and second longitudinally spaced positions.

21. A support as set forth in claim 20, wherein:

said first support means comprises at least one pair of legs laterally spaced with respect to each other so as to be disposed within a single transverse plane with respect to said longitudinal extent of said base member, and projecting upwardly away from said base member; and at least one pair of deformable blade members flexibly and resiliently mounted respectively upon free end portions of said at least one pair of legs and oriented toward each other so as to cooperate with each other for engaging a first side portion of an elongate article.

22. A support as set forth in claim 21, wherein:

said second support means comprises partition means projecting upwardly from said base member.

23. A support as set forth in claim 22, wherein:

said partition means comprises a pair of partitions disposed upon opposite longitudinally spaced sides of said first support means.

24. A support as set forth in claim 21, wherein:

said first support means comprises a plurality of pairs of legs laterally spaced with respect to each other in a first transverse plane across said base member; and said second support means comprises partition means extending transversely across said base member within a second transverse plane.

25. A support as set forth in claim 21, wherein:

said second support means comprises at least one pair of legs laterally spaced with respect to each other so as to be disposed within a single transverse plane with respect to said longitudinal extent of said base member, and projecting upwardly away from said base member; and at least one pair of deformable blade members flexibly and resiliently mounted respectively upon free end portions of said at least one pair of legs and oriented toward each other so as to cooperate with each other for engaging a second side portion of an elongate article.

26. A support as set forth in claim 25, wherein:

said second support means comprises a plurality of pairs of legs laterally spaced with respect to each other within said single transverse plane extending across said base member.

27. A support for an elongate article, selected from the group comprising a tube, a pipe, an electrical cable, and a conduit, comprising:

a base member having a substantially longitudinal extent;

a first support means mounted upon said base member at a first longitudinal position along said longitudinal extent of said base member and projecting upwardly from said base member to a first elevational level above said base member so as to engage a first side portion of an elongate article; and a second support means mounted upon said base member at a second longitudinal position along said longitudinal extent of said base member and projecting upwardly from said base member to a second elevational level above said base member so as to engage a second opposite side portion of an elongate article;

said base member, said first support means, and said second support means comprising a one-piece component whereby an elongate article is able to be securely supported upon said base member as a result of the cooperation of said first and second support means engaging opposite side portions of such an elongate article at said first and second longitudinally spaced positions.

28. A support as set forth in claim 27, wherein:

said first support means comprises at least one pair of legs laterally spaced with respect to each other so as to be disposed within a single transverse plane with respect to said longitudinal extent of said base member, and projecting upwardly away from said base member; and at least one pair of deformable members flexibly and resiliently mounted respectively upon free end portions of said at least one pair of legs and oriented toward each other so as to cooperate with each other for engaging a first side portion of an elongate article; and said second support means comprises partition means projecting upwardly from said base member.

29. A support as set forth in claim 28, wherein:

said first support means comprises a plurality of pairs of legs laterally spaced with respect to each other in a first transverse plane across said base member; and said second support means comprises partition means extending transversely across said base member within a second transverse plane.

30. A support as set forth in claim 27, wherein:

said second support means comprises at least one pair of legs laterally spaced with respect to each other so as to be disposed within a single transverse plane with respect to said longitudinal extent of said base member, and projecting upwardly away from said base member; and at least one pair of deformable blade members flexibly and resiliently mounted respectively upon free end portions of said at least one pair of legs and oriented toward each other so as to cooperate with each other for engaging a second side portion of an elongate article.

31. A support as set forth in claim 30, wherein:

said second support means comprises a plurality of pairs of legs laterally spaced with respect to each other within said single transverse plane extending across said base member.

* * * * *